US012046795B2

(12) United States Patent
Cross et al.

(10) Patent No.: US 12,046,795 B2
(45) Date of Patent: Jul. 23, 2024

(54) TELECOMMUNICATIONS MOUNTING FRAMES AND METHODS OF MAKING SAME

(71) Applicant: CommScope Technologies LLC, Hickory, NC (US)

(72) Inventors: Brian Douglas Cross, Double Oak, TX (US); Douglas R Fuller, Denton, TX (US); Roger K. Hanson, Fort Worth, TX (US); Charles J. Mann, Omaha, NE (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 9 days.

(21) Appl. No.: 17/683,669

(22) Filed: Mar. 1, 2022

(65) Prior Publication Data

US 2022/0311121 A1 Sep. 29, 2022

Related U.S. Application Data

(60) Provisional application No. 63/165,357, filed on Mar. 24, 2021.

(51) Int. Cl.
*H01Q 1/12* (2006.01)

(52) U.S. Cl.
CPC ............. *H01Q 1/1207* (2013.01); *H01Q 1/12* (2013.01)

(58) Field of Classification Search
CPC ...... H01Q 1/1207; H01Q 1/12; H01Q 1/1235; H01Q 1/1242
See application file for complete search history.

(56) References Cited

U.S. PATENT DOCUMENTS 2,192,904 A * 3/1940 Ferris ........................ F16B 7/00 126/91 A
2,647,267 A * 8/1953 McLaughlin .......... A47C 19/20 5/9.1

(Continued)

FOREIGN PATENT DOCUMENTS

JP 2000088173 A 3/2000
WO 2006057099 A1 6/2006

OTHER PUBLICATIONS

PCT Notification of Transmittal of the International Search Report and the Written Opinion of the International Searching Authority, or the Declaration, mailed Jun. 13, 2022, in corresponding International Application No. PCT/US2022/018237.

(Continued)

*Primary Examiner* — Nkeisha Smith
(74) *Attorney, Agent, or Firm* — Myers Bigel, P.A.

(57) ABSTRACT

The present disclosure describes a telecommunications structure including a plurality of mounting members each having a length and a diameter, the plurality of mounting members includes one or more vertically-oriented mounting members that intersect with one or more horizontally-oriented mounting members to form a frame that is configured to have telecommunications equipment mounted thereto. Each of the one or more vertically-oriented mounting members or each of the one or more horizontally-oriented mounting members includes a plurality of longitudinally spaced-apart recesses configured to receive an intersecting horizontally-oriented mounting member or vertically-oriented mounting member and form a mechanical connection therebetween. A press tool for forming the recesses and methods of using the same are also described herein.

20 Claims, 13 Drawing Sheets

(56) References Cited

U.S. PATENT DOCUMENTS 2,812,833 A * 11/1957 O'Nan ................. H01Q 1/1235 52/117
3,006,669 A * 10/1961 Novales ................. A47B 57/54 403/217
3,365,722 A * 1/1968 Blonder ............... H01Q 1/1228 343/915
3,408,655 A * 11/1968 Tsuge ................... H01Q 1/1228 343/915
3,424,178 A * 1/1969 Yoshimi .............. E04B 1/34326 135/160
3,638,814 A * 2/1972 Lowery ..................... A47F 5/13 248/165
4,104,642 A * 8/1978 Padilla ................. H01Q 1/1228 343/882
4,253,224 A * 3/1981 Hickman ................ B23P 11/00 72/370.11
4,493,578 A * 1/1985 D'Alessio ............... E04G 7/307 182/186.8
4,603,756 A * 8/1986 Layher ...................... E04G 7/32 29/515
4,652,890 A * 3/1987 Crean .................... H01Q 1/125 248/185.1
4,741,081 A * 5/1988 Redman ................ B21C 37/296 29/33 J
4,867,274 A * 9/1989 Langer ...................... E04G 7/32 52/638
5,517,744 A * 5/1996 Moser ................... F16L 41/045 5/93.1
5,954,305 A * 9/1999 Calabro ............... H01Q 1/1242 343/890
6,115,004 A * 9/2000 McGinnis ............ H01Q 1/1242 343/890
6,314,595 B1 * 11/2001 Price .................... A47C 19/005 5/9.1
6,561,473 B1 * 5/2003 Ianello .................. F16B 7/0493 403/384
7,578,488 B2 * 8/2009 Kiser ....................... H02G 7/05 248/219.3
8,439,166 B2 * 5/2013 Kreller .................... E04G 11/48 182/178.1
9,385,413 B2 * 7/2016 Pass ..................... H01Q 1/1207
9,972,906 B2 * 5/2018 Vassilakis ................ H01Q 3/08
10,495,237 B1 * 12/2019 Meyer ..................... F16L 3/221
10,863,829 B2 * 12/2020 Rohr .................... A47C 19/021
10,974,348 B2 * 4/2021 Priefert ................ B23K 1/0008
2011/0279347 A1 * 11/2011 Pass ........................ E04G 3/243 343/890
2013/0283724 A1 10/2013 Lindquist
2018/0238474 A1 8/2018 Braddock
2021/0156148 A1 * 5/2021 Daton-Lovett ......... E04C 3/005

OTHER PUBLICATIONS

Utility U.S. Appl. No. 17/473,079, filed Sep. 13, 2021 (including Official Filing Receipt).

* cited by examiner

TELECOMMUNICATIONS MOUNTING FRAMES AND METHODS OF MAKING SAME

RELATED APPLICATION(S)

The present application claims priority to and the benefit of U.S. Provisional Application Ser. No. 63/165,357, filed Mar. 24, 2021, the disclosure of which is hereby incorporated herein in its entirety.

FIELD

The present application is directed generally toward telecommunications structures, and more particularly, telecommunications mounting frames and methods of making same.

BACKGROUND

Traditional materials and joinery methods used in the telecommunications industry are not conducive to the creation of a passive intermodulation (PIM) isolated structure. As illustrated in FIG. 1, a telecommunications structure 10 may include a metallic antenna platform 30 having a plurality of vertical pipes 12 and a plurality of horizontal pipes 14. Typically, the vertical and horizontal pipes 12, 14 are formed from steel and are secured together via a mechanical connection 20, 20', e.g., U-bolts, mounts, or other steel connection (see FIGS. 1B and 1C). The antenna platform 30 may be then secured to a mounting structure (e.g., an antenna tower) via a separate mount 15 (e.g., a rig mount). The mechanical connections 20, 20' (e.g., U-bolts) provide a sufficient clamp load to secure the vertical and horizontal pipes 12, 14 together to form the antenna platform 30 and maintain the structural support necessary such that telecommunications equipment (e.g., antennas or radios) may be secured to the antenna platform 30.

As illustrated in FIG. 2, another telecommunications structure 100 may include a metallic antenna mount 130 having a plurality of vertical pipes 112 and a plurality of horizontal pipes 114. Similar to the vertical and horizontal pipes 12, 14 forming the antenna platform 30, typically, the vertical and horizontal pipes 112, 114 of the antenna mount 130 are formed from steel and are secured together via a mechanical connection 120, e.g., U-bolts, mounts, or other steel connection. The antenna mount 130 may be then secured to a mounting structure (e.g., an antenna tower) via a separate mount 115 (e.g., a pipe clamp). The mechanical connections 120 (e.g., U-bolts) provide a sufficient clamp load to secure the vertical and horizontal pipes 112, 114 together to form the antenna mount 130 and maintain the structural support necessary such that telecommunications equipment (e.g., antennas or radios) may be secured to the antenna mount 130.

Currently, the mechanical connections 20, 20', 120 within the telecommunications structures 10, 100 (e.g., U-bolts, pipe clamp mounts, etc.) allow for slight relative movement/shifting between components, which can create unwanted PIM in the modern radio frequency (RF) environment. In addition, the use of metal (i.e., steel) components near an antenna on cell sites, for example, at the mechanical connection 20, 20', 120 points between the vertical pipes 12, 112 and the horizontal pipes 14, 114, can further be a source of unwanted PIM. There may be a need for alternative mechanical connections within a telecommunication structure that reduce costs and allow for easy installation, while also alleviating technical performance concerns, such as PIM.

SUMMARY

A first aspect of the present invention is directed to a telecommunications structure including a plurality of mounting members each having a length and a diameter, the plurality of mounting members includes one or more vertically-oriented mounting members that intersect with one or more horizontally-oriented mounting members to form a frame that is configured to have telecommunications equipment mounted thereto. Each of the one or more vertically-oriented mounting members or each of the one or more horizontally-oriented mounting members includes a plurality of longitudinally spaced-apart recesses configured to receive an intersecting horizontally-oriented mounting member or vertically-oriented mounting member and form a mechanical connection therebetween.

Another aspect of the present invention is directed to a press tool. The press tool includes two clamp members configured to cooperate with each other to form a tubular channel that is sized and configured to hold a section of a mounting member therein, a pin block member having a main body, the pin block member including a pin member extending upwardly from the main body and a pair of arm members extending outwardly from the main body in opposite directions, and a press form member having a main body with an aperture extending therethrough, the aperture configured to receive the pin member. When secured together, the pin block member resides between the two clamp members and at least a portion of the press form member is configured to fit within a channel formed by the secured together clamp members, and the press form member is configured to press into the section of the mounting member to form a recess.

Another aspect of the present invention is directed to a method of forming recesses in a mounting member of a telecommunications structure. The method includes (a) providing the mounting member having a length and a diameter and has a plurality of spaced-apart preformed apertures; (b) providing a press tool including two clamp members, each clamp member having a arcuate recess configured to cooperate with each other to form a tubular channel, a pin block member including a pin member extending upwardly from a main body, and a press form member having a main body with an aperture extending therethrough, wherein a bottom edge of the main body of the press form member has an arcuate profile; (c) inserting the pin member of the pin block member into respective apertures in the mounting member such that the pin member extends through the mounting member; (d) pushing the clamp members together to engage and secure a section of the mounting member within the tubular channel; (e) placing the arcuate bottom edge of the press form member on top of the pin member of the pin block member such that the pin member is received within the aperture of the press form member and the arcuate bottom edge of the press form member contacts the mounting member; and (f) pushing the press form member downwardly into the mounting member a predetermined depth to form a recess in the mounting member.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1B:
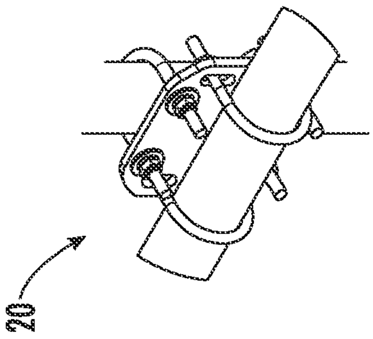
FIG. 1B (PRIOR ART)
FIGS. 1A-1C and FIG. 2 illustrate prior known telecommunications structures, namely, an antenna platform and corresponding mechanical connections (FIGS. 1A-1C) and an antenna mount (FIG. 2).

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10", 10"').

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer, or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 1C:
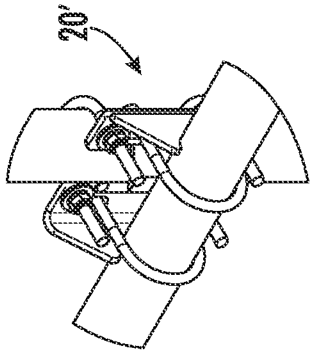
FIG. 1C (PRIOR ART)
Figure 1A:
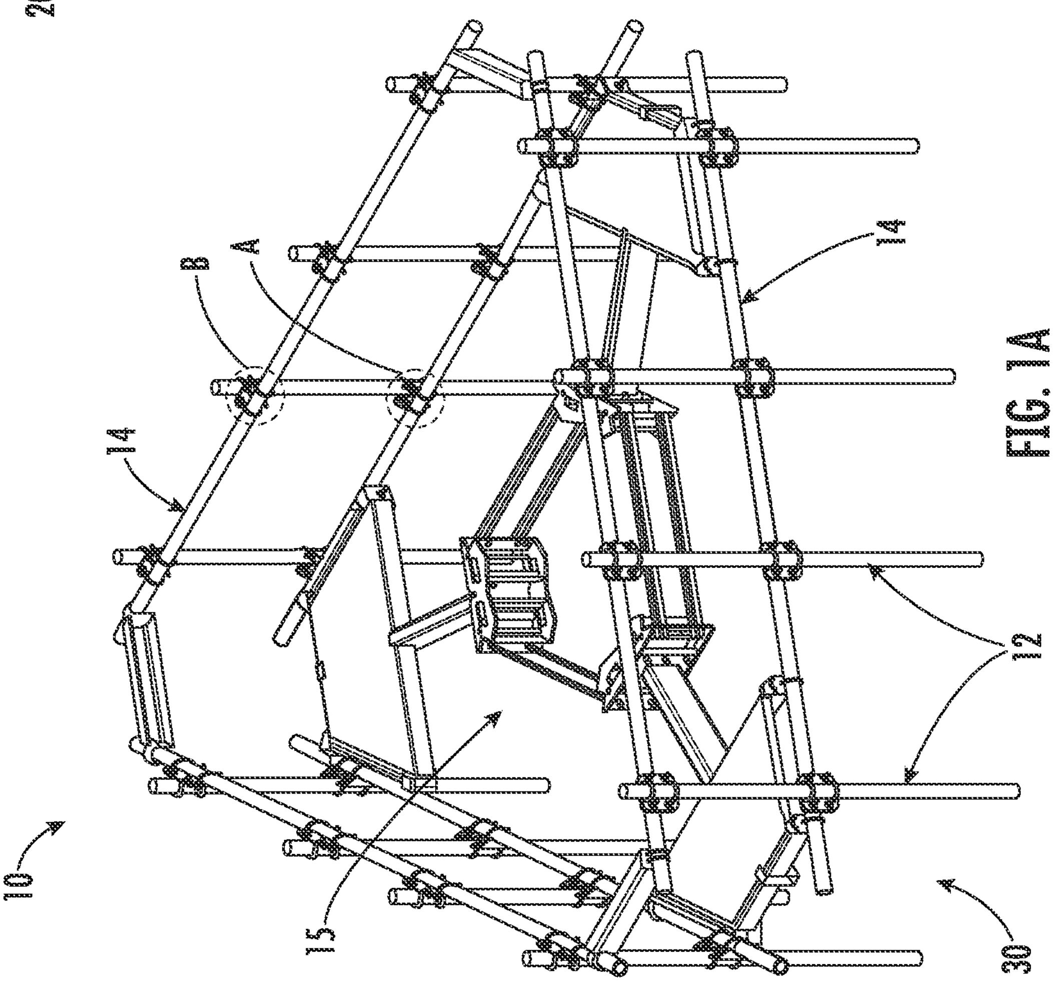
FIG. 1A (PRIOR ART)
Figure 2:
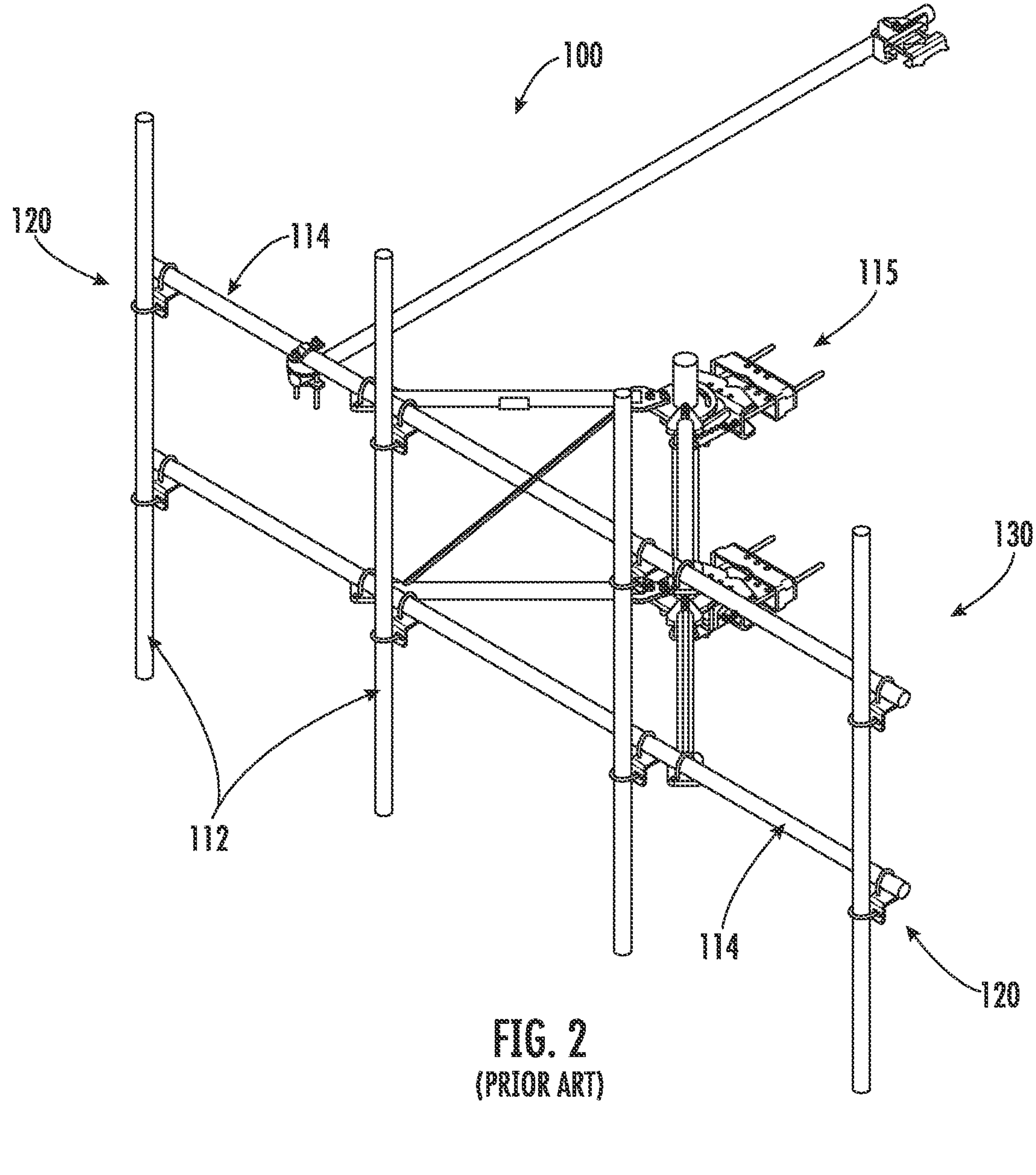
FIG. 2 (PRIOR ART)
Figure 3B:
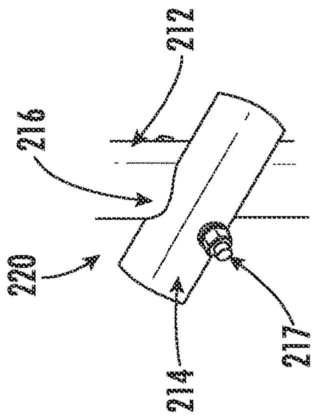
FIG. 3B is an enlarged view of the circled section labeled "A" in FIG. 3A.
Figure 3A:
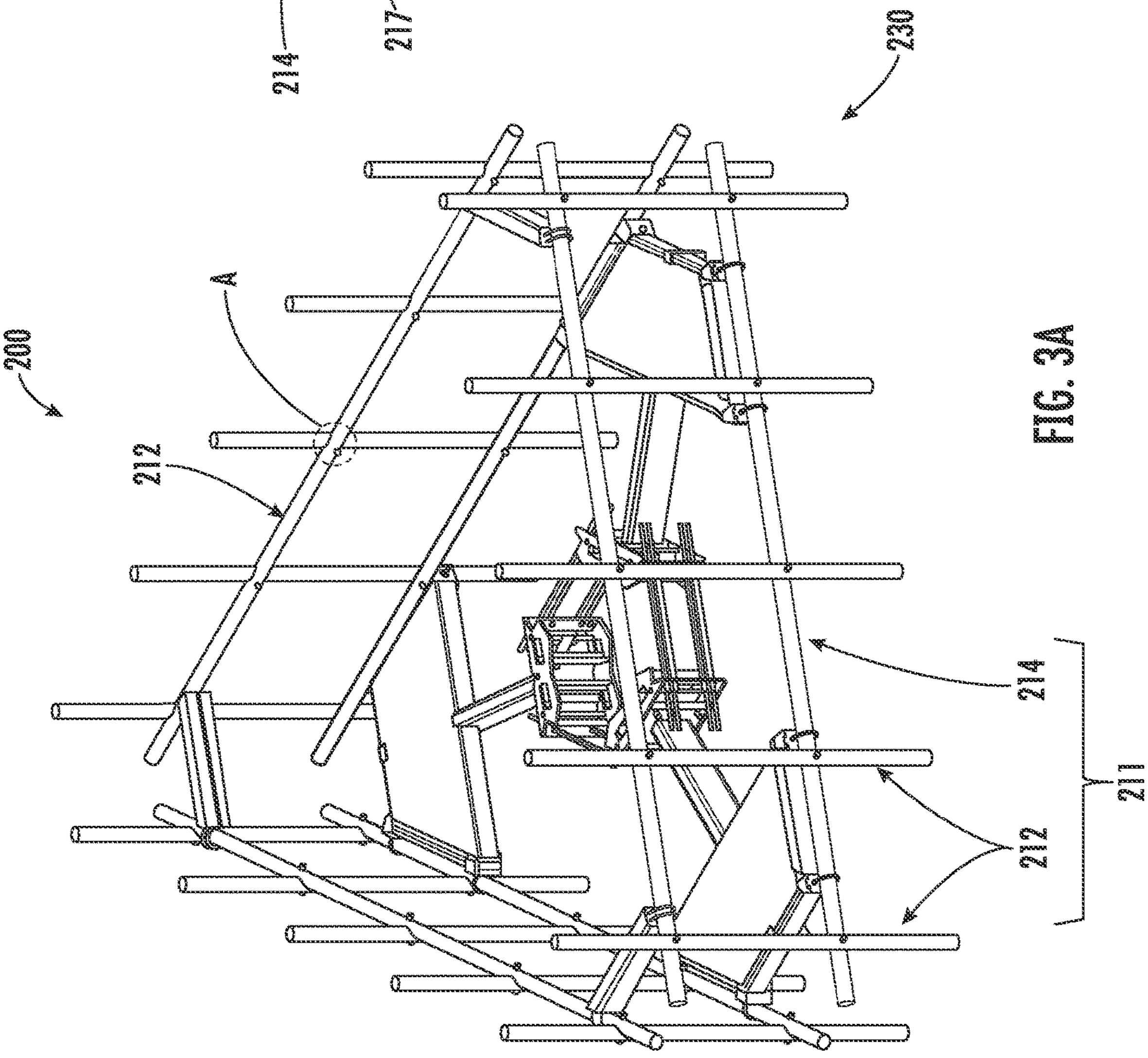
FIG. 3A is a perspective view of a telecommunications platform according to embodiments of the present invention.

Referring to FIGS. 3A-3B, a telecommunications platform 200 according to embodiments of the present invention is illustrated. As shown in FIG. 3, the telecommunications platform 200 is similar to the prior known telecommunications structure 10 illustrated in FIG. 1 and includes an antenna platform 230 having a plurality of mounting members (or pipes) 211 (i.e., a plurality of vertical members (or pipes) 112 and a plurality of horizontal members (or pipes) 114). The telecommunications platform 200 of the present invention differs from the prior known telecommunications structure 10 in that the telecommunications platform 200 utilizes a different mechanical connection 220 to secure the vertical and horizontal pipes 212, 214 together. For example, as shown in FIG. 3B, and discussed in further detail below, in some embodiments, at least one of the vertical or horizontal pipes 212, 214 includes one or more cutout sections or recesses 216 configured to receive a corresponding horizontal or vertical pipe 214, 212 and secured together via a fastener 217 (e.g., a threaded bolt). In some embodiments, one or more of the mounting members 211 may be formed of steel. In some embodiments, one or more of the mounting members 211 may be formed of a fiber-reinforced polymer. A fiber-reinforced polymer or "FRP" is a composite material made of a polymer matrix reinforced with fibers. In some embodiments, the fiber-reinforced polymer that forms the one or more mounting pipes 211 of the present invention may comprise a polyester thermosetting plastic reinforced with a fiberglass. In some embodiments, the fiber-reinforced polymer may comprise a "sandwich" composite or structure in which an open- or closed-cell-structured foam may be used as the core material (or middle layer) and fiber-reinforced polymers may be used to form the outer layers (i.e., the foam is sandwiched between the fiber-reinforced polymers). A variety of known materials may be used as the core material, for example, polystyrene foams, polyurethane, polyethylene, balsa wood, and aramid. Other examples of fiber-reinforced polymer mounting pipes are described in U.S. Utility patent application Ser. No. 17/473,079, filed Sep. 13, 2021, the disclosure of which is hereby incorporated herein in its entirety.

Figure 4A:
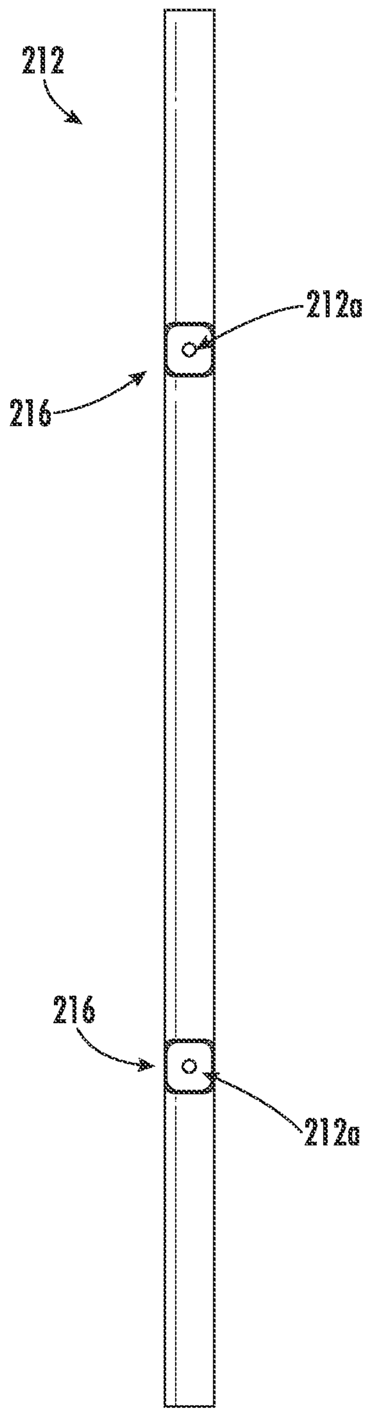
FIG. 4A is a top view of a mounting member of the telecommunications platform of FIG. 3 according to embodiments of the present invention.
Figure 4B:
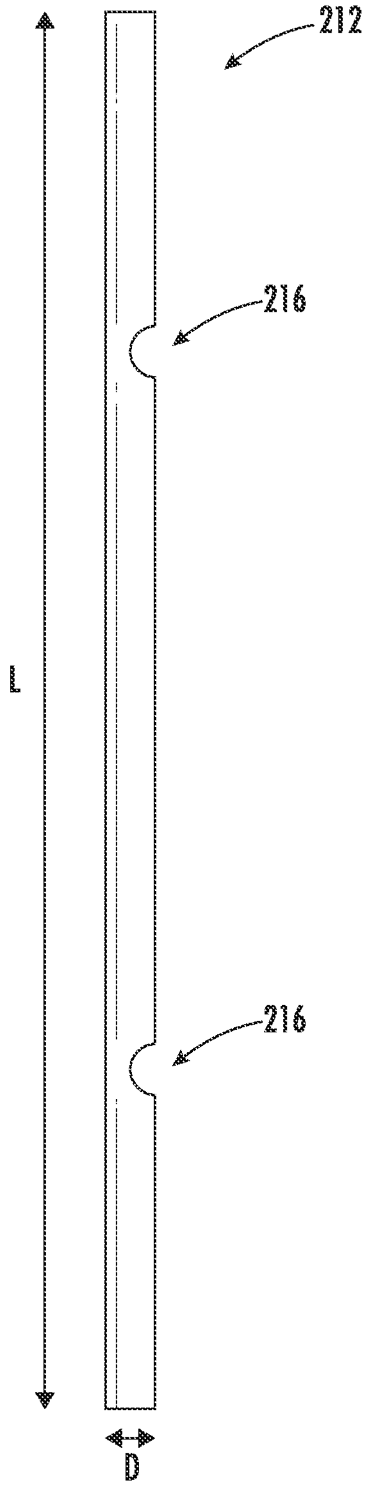
FIG. 4B is a side view of the mounting member of FIG. 4A.
Figure 4C:
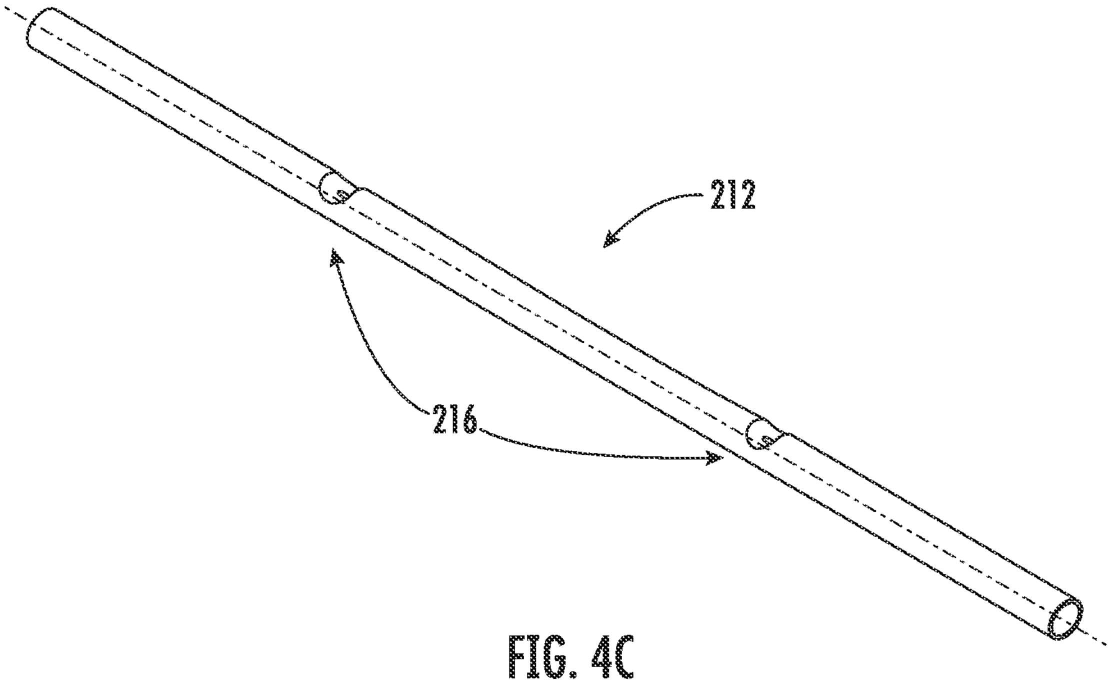
FIG. 4C is a perspective view of the mounting member of FIG. 4A.

Referring to FIGS. 4A-4D, one of the mounting members 211 (e.g., vertical pipe 212) according to embodiments of the present invention is illustrated. Each vertical pipe 212 of the telecommunications platform 200 (e.g., antenna frame 230) may have a similar configuration. Each vertical pipe 212 has a length (L) and a diameter (D). As shown in FIGS. 4A-4C, each vertical pipe 212 includes one or more longitudinally spaced-apart recesses 216. In some embodiments, the recesses 216 may be formed by making a semi-cylindrical cut into the vertical pipe 212. In other embodiments, the recesses 216 may be formed by making a semi-cylindrical indention into the vertical pipe 212 using a press tool 400 described herein (see, e.g., FIG. 12).

Figure 6A:
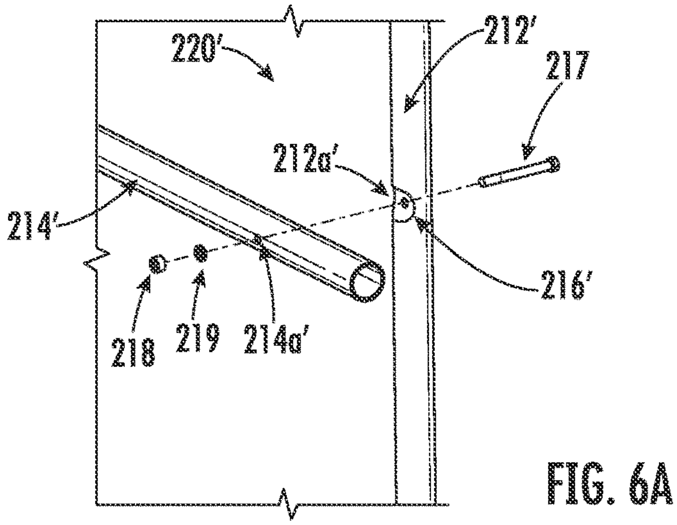
FIG. 6A is an exploded front perspective illustrating two mounting members being secured together according to embodiments of the present invention.
Figure 6B:
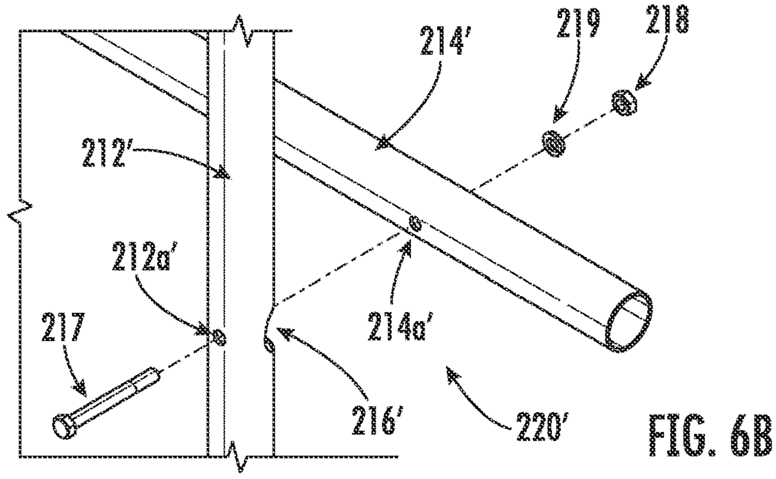
FIG. 6B is an exploded rear perspective illustrating the two mounting members of FIG. 6A being secured together according to embodiments of the present invention.
Figure 7:
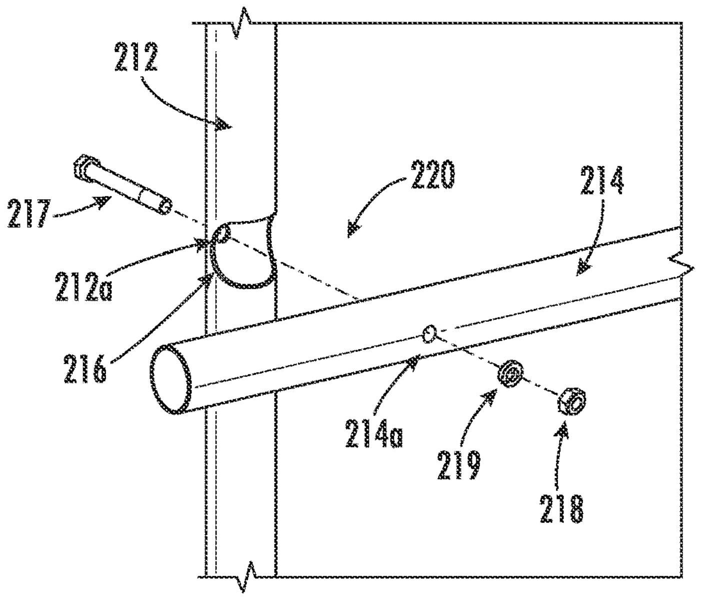
FIG. 7 is an exploded front perspective illustrating two alternative mounting members being secured together according to embodiments of the present invention.

Each recess 216 is sized and configured to receive at least a portion of a corresponding mounting member 211 (e.g., horizontal pipe 214) (see, e.g., FIGS. 6A-6B and FIG. 7). At least one aperture 212*a* resides within each recess 216. In some embodiments, aligned apertures 212*a* reside within each recess 216 (i.e., on opposing sides of the vertical pipe 212), for example, when the recess 216 is formed by a press tool 400, which is discussed in further detail below. Each aperture 212*a* is configured to receive a fastener 217 when the vertical pipe 212 is secured to a respective horizontal pipe 214 (see, e.g., FIGS. 6A-6B and FIG. 7).

Figure 4D:
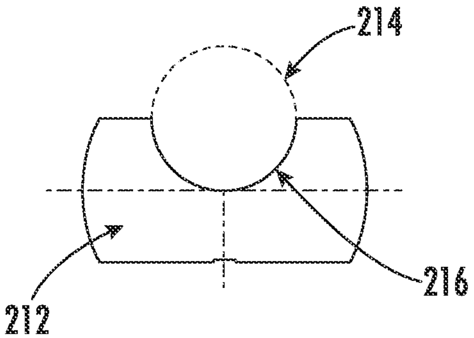
FIG. 4D is an enlarged side view of a recess of the mounting member of FIG. 4A.

The recesses 216 may be formed to penetrate to different depths and/or have different shapes in the mounting pipe 211 (see, e.g., FIGS. 5A-5E and FIGS. 8A-8D). As shown in FIG. 4D, in some embodiments, the recesses 216 may penetrate to about the midpoint of the vertical pipe 212 (i.e., about half the diameter (D) of the vertical pipe 212).

Figure 4E:
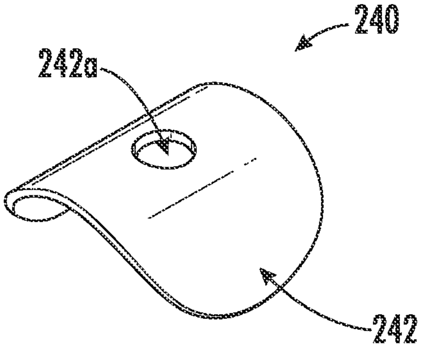
FIG. 4E is a perspective view of a support bracket that may be used with the mounting member of FIG. 4A.

FIG. 4E illustrates a support bracket 240 according to embodiments of the present invention. The support bracket 240 has an arcuate main body 242 that corresponds to the outer profile of the corresponding mounting member 211 (e.g., horizontal pipe 214) that will be received within a recess 216. In some embodiments, the support bracket 240 may be formed from the cutout section of the vertical pipe 212 that has been removed to form the recess 216. An aperture 242*a* resides in the center of the main body 242 of the support bracket 240. The aperture 242*a* is configured to receive the fastener 217, for example, when the vertical pipe 212 is secured to a respective horizontal pipe 214.

In some embodiments, the support bracket 240 may be used as part of the mechanical connection 120 to help further secure the vertical and horizontal pipes 212, 214 together. For example, in some embodiments, after a horizontal pipe 214 is received within a respective recess 216 of the vertical pipe 212, the support bracket 240 may be positioned on the opposing side of vertical pipe 212, opposite the recess 216. A fastener 217 may then be inserted through respective apertures 242*a*, 212*a*, 214*a*, in the support bracket 240, vertical pipe 212, and horizontal pipe 214 to secure them together. When used, the support bracket 240 may provide additional structural support to the mechanical connection 220, similar to a Belleville washer, and thus, the antenna frame 230.

Referring to FIGS. 5A-5E, an alternative mounting member 211 (e.g., vertical pipe 212') according to embodiments of the present invention is illustrated. The vertical pipe 212' is similar to the vertical pipe 212 described herein. As shown in FIGS. 5A-5E, each vertical pipe 212' includes one or more spaced apart recesses 216'. Each recess 216' is sized and configured to receive at least a portion of a corresponding horizontal pipe 214 (see, e.g., FIGS. 6A-6B and FIG. 7). At least one aperture 212*a*' resides within each recess 216'. Each aperture 212*a*' is configured to receive a fastener 217, for example, when the vertical pipe 212' is secured to a respective horizontal pipe 214 (see, e.g., FIGS. 6A-6B, and FIG. 7).

Figure 5A:
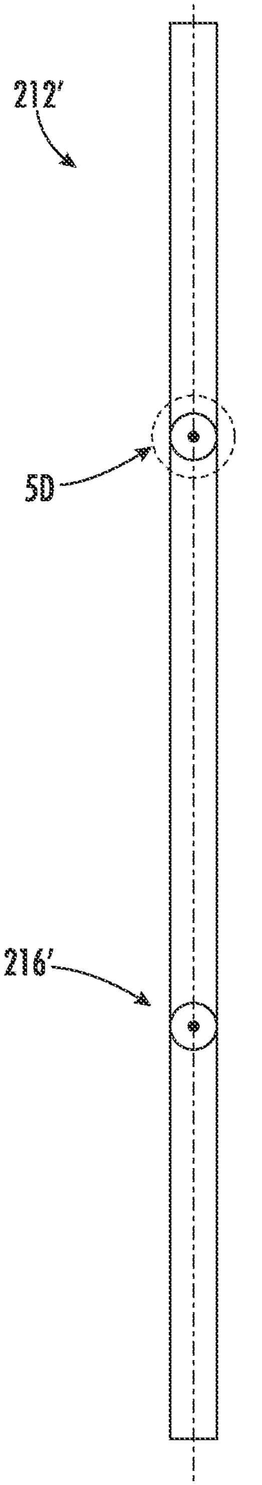
FIG. 5A is a top view of an alternative mounting member for the telecommunications platform of FIG. 3 according to embodiments of the present invention.
Figure 5B:
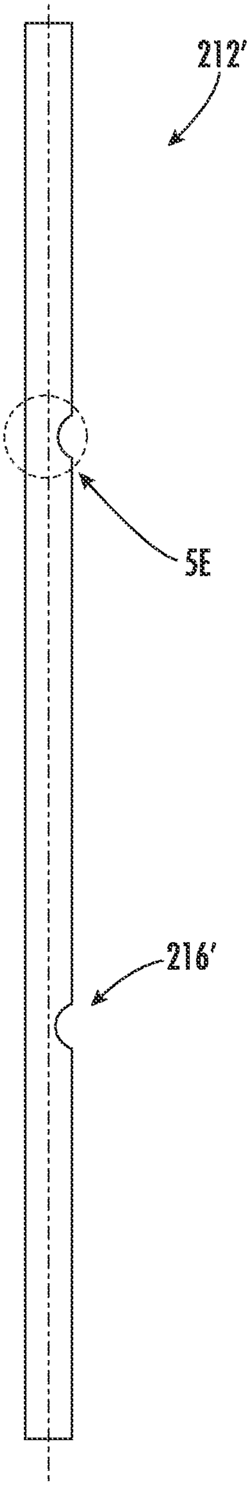
FIG. 5B is a side view of the mounting member of FIG. 5A.
Figure 5C:
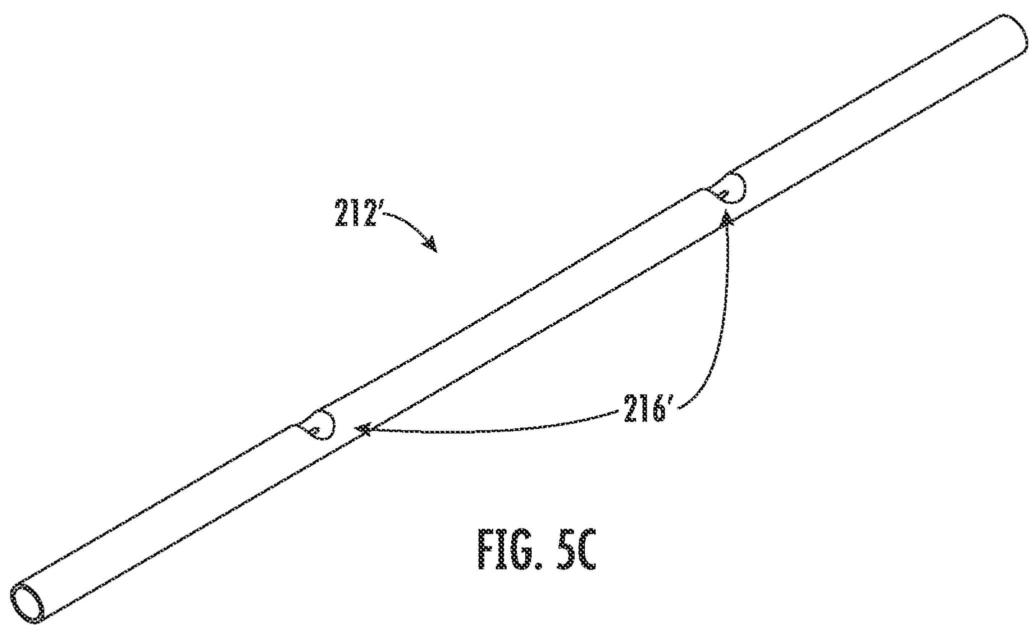
FIG. 5C is a perspective view of the mounting member of FIG. 5A.
Figure 5D:
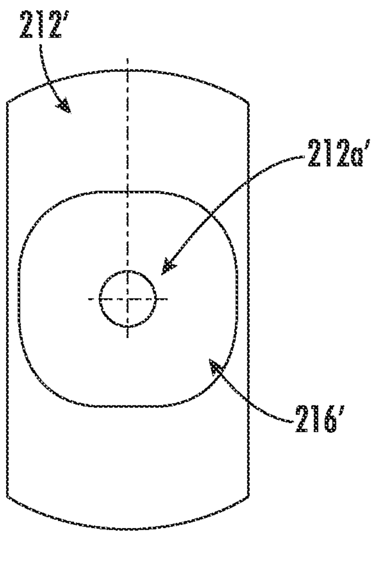
FIG. 5D is an enlarged top view of a recess of the mounting member of FIG. 5A.
Figure 5E:
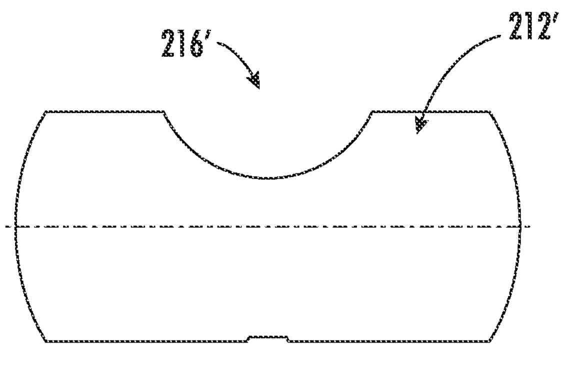
FIG. 5E is an enlarged side view of the recess of FIG. 5D.

The vertical pipe 212' differs from the vertical pipe 212 described above in that the depth of the recesses 216' formed in the vertical pipe 212' does not penetrate as deep into the vertical pipe 212' as compared to the depth of the recesses 216 of vertical pipe 212. As shown in FIG. 5B and FIG. 5E, in some embodiments, the recesses 216' penetrate to a depth that is less than the midpoint of the vertical pipe 212' (i.e., less than half the diameter (D)). Similar to the vertical pipe 212 described herein, in some embodiments, each recess 216' of vertical pipe 212' may be formed by making a semi-cylindrical cut in the vertical pipe 212'. In other embodiments, discussed in further detail below, each recess 216' may be formed by making a semi-cylindrical indentation with a press tool 300 (see, e.g., FIGS. 10A-12).

FIGS. 6A-6B and FIG. 7 illustrate the mechanical connections 220, 220' of the telecommunications structure 200 according to embodiments of the present invention utilizing the vertical pipes 212, 212' described herein. As shown in FIGS. 6A-6B and FIG. 7, during assembly of the antenna frame 230 for the telecommunications structure 200, the horizontal pipes 214, 214' are received by receptive recesses 216, 216' in the corresponding vertical pipes 212, 212'. A fastener 217 (e.g., a threaded bolt) is inserted through the apertures 212*a*, 212*a*' residing in the recesses 216, 216' of the vertical pipes 212, 212' and through a corresponding aperture 214*a*, 214*a*' in the horizontal pipes 214, 214' and secured with a nut 218 and washer 219, thereby securing the vertical (212, 212') and horizontal (214, 214') pipes together.

While the embodiments discussed above are described with reference to the vertical pipes 212, 212' of the telecommunications structure 200 having one or more recesses 216, 216', it is noted that any of the mounting members 211 (i.e., vertical pipes 212, 212' and/or horizontal pipes 214, 214') may include one or more spaced apart recesses 216, 216' that may be configured to receive at least a portion of a corresponding mounting member 211 (i.e., vertical pipes 212, 212' and/or horizontal pipes 214, 214'). As such, in some embodiments, each of the horizontal pipes 214, 214' may include one or more longitudinally spaced-apart recesses 216, 216' configured to receive at least a portion of a corresponding vertical pipe 214, 214' (see, e.g., FIG. 3).

Figure 8A:
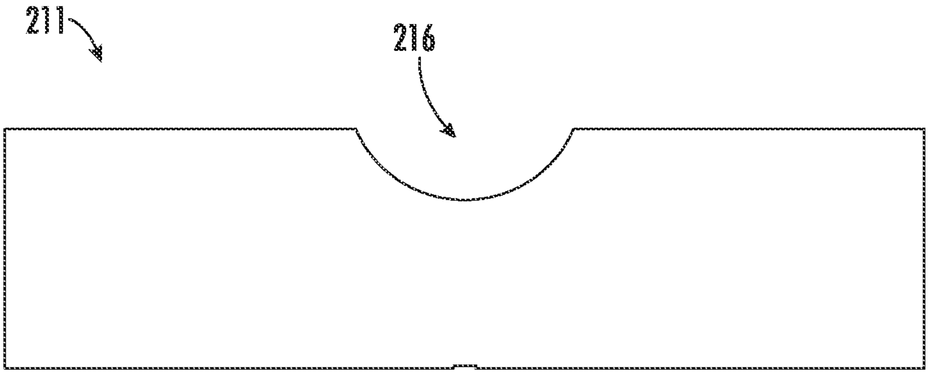
FIG. 8A and FIG. 8B illustrate exemplary recess shapes that may be formed in the mounting members according to embodiments of the present invention.
Figure 8B:
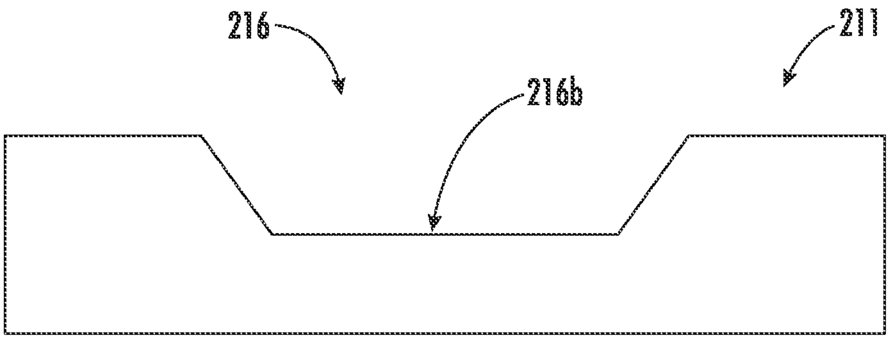

FIGS. 8A-8B illustrate exemplary shapes and depths of the recesses 216 in the mounting members 211 (i.e., vertical and/or horizontal pipes 212, 214) according to embodiments of the present invention. FIG. 8A illustrates the recess 216 penetrating the mounting member 211 at a depth that is even less than the embodiments shown in FIGS. 5A-5E. FIG. 8B illustrates recesses 216 having a hemi-hexagonal shape (e.g., have a generally flat bottom section 216*b*) (see also, e.g., FIG. 9B). The hemi-hexagonal shape of the recess 216 may be a cutout or flattened feature configured to interlock with an identical mating feature (i.e., recess 216) in a corresponding mounting member 211)

Figure 9A:
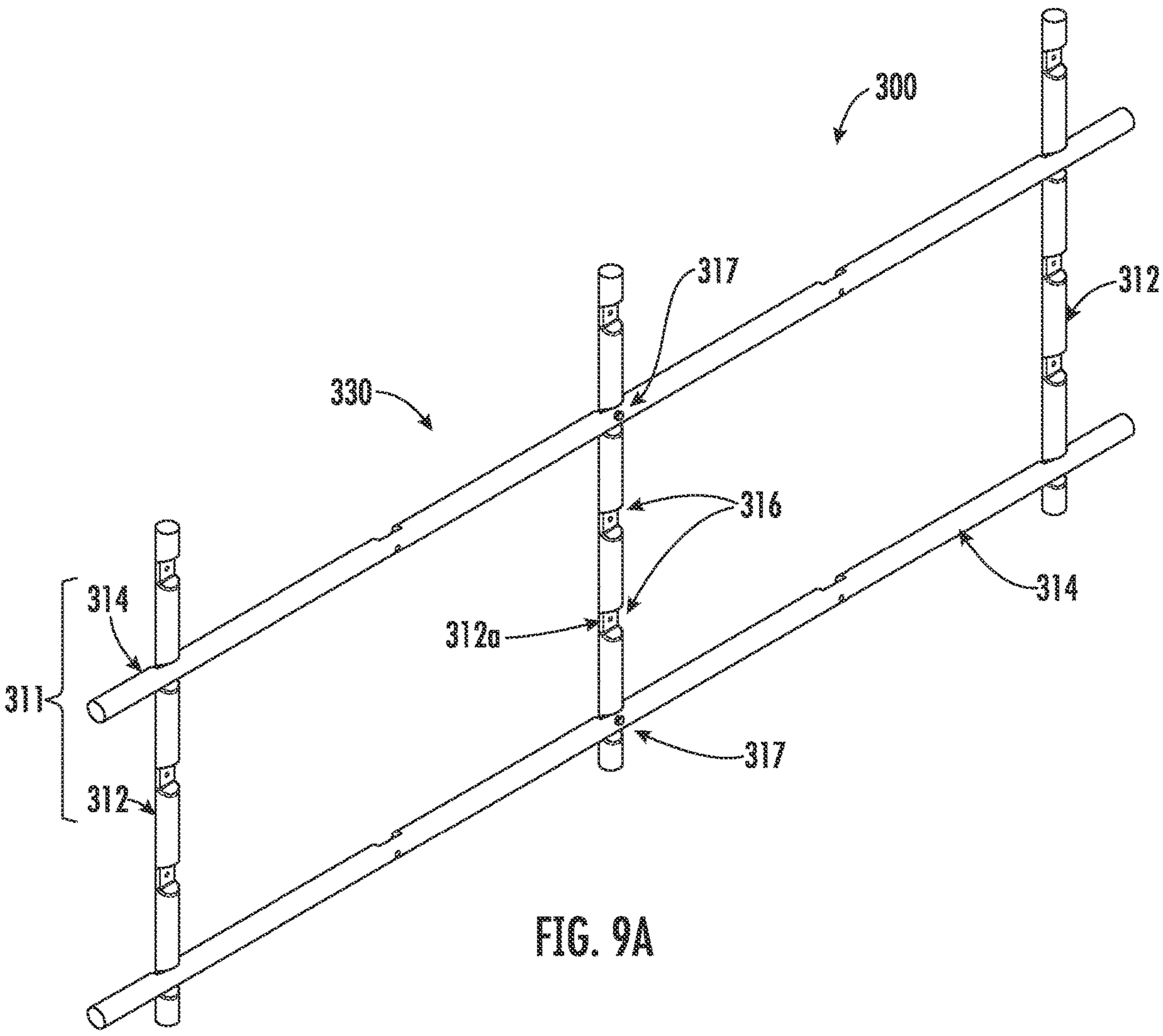
FIG. 9A is a perspective view of an alternative telecommunications mount according to embodiments of the present invention.
Figure 9B:
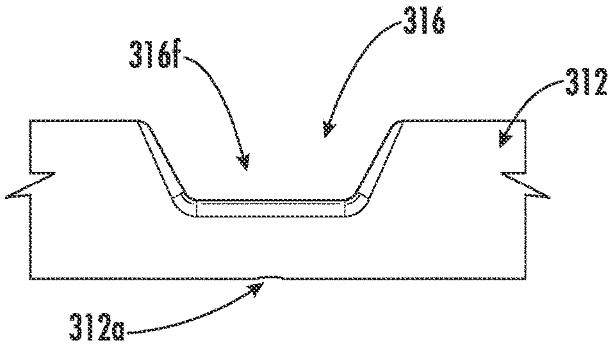
FIG. 9B is an enlarged side view of a recess of the mounting member for the telecommunications mount of FIG. 9A.

Referring to FIGS. 9A-9B, a telecommunications mount 300 according to embodiments of the present invention is illustrated. The properties and/or features of the telecommunications mount 300 and corresponding mounting members 311 (i.e., vertical pipes 312 and horizontal pipes 314) may be as described above in reference to the telecommunications platform 200 shown in FIGS. 3-8D and duplicate discussion thereof may be omitted herein for purposes of discussing FIGS. 9A-9B.

As shown in FIG. 9A, the telecommunications mount 300 is similar to the telecommunications platform 200 described herein and includes an antenna frame 330 having a plurality of mounting members 311 (i.e., a plurality of vertical pipes 312 and a plurality of horizontal pipes 314). Each vertical pipe 312 includes one or more longitudinally spaced-apart recesses 316. Each recess 316 is sized and configured to receive at least a portion of a corresponding horizontal pipe 314. At least one aperture 312*a* resides within each recess 316 and is configured to receive a fastener 317, for example, when the vertical pipe 312 is secured to a respective horizontal pipe 314. As shown in FIG. 9B, the recesses 216 have a hemi-hexagonal shape with a generally flat bottom section 316*f* (see also, e.g., FIG. 8B and FIG. 8C).

Similar to the mounting members 211 described herein, any of the mounting members 311 (i.e., vertical pipes 312 and/or horizontal pipes 314) may include one or more spaced-apart recesses 316 that may be configured to receive at least a portion of a corresponding mounting member 311 (i.e., vertical pipes 312 and/or horizontal pipes 314). As such, in some embodiments, each of the horizontal pipes 314 may include one or more spaced apart recesses 316 configured to receive at least a portion of a corresponding vertical pipe 314.

The various embodiments illustrated above may provide multiple benefits to the mounts, platforms, and/or other structures discussed above. One potential advantage is the security of the joint itself. When a U-bolt or similar fastener is employed to connect perpendicular round pipes, there may be a tendency for the pipes to be able to move slightly relative to each other. This tendency can increase over time, particularly of the U-bolt loosens somewhat. Not only can such movement cause potential mispositioning of elements (such as antennas) mounted on the pipes, but such movement between metallic elements can also contribute to Passive Intermodulation (PIM), which can negatively impact signal performance. In contrast, the joints between perpendicular pipes in which one of the pipes has a recess, and a bolt or other fastener is inserted through both pipes, should be more stable and considerably less prone to loosening and permitting relative movement. As such, both the mispositioning and PIM issues can be addressed by joints as described above.

It should also be noted that PIM issues can also be addressed by forming one or both of the joined elements from a non-metallic material, such as the FRP discussed above, or by coating metallic materials with a non-metallic material (e.g., a polymer, a ceramic, or the like).

Figure 10A:
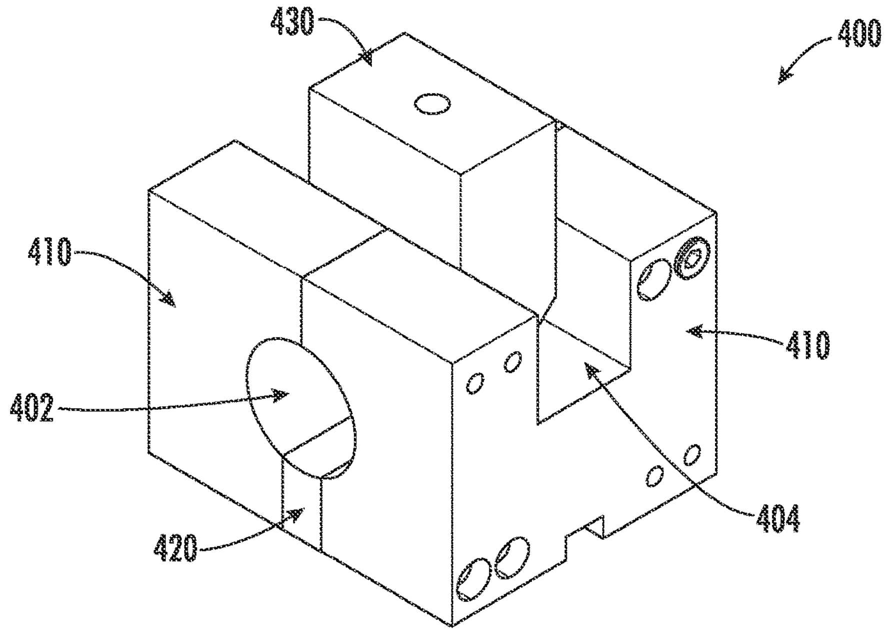
FIG. 10A is a perspective view of a press tool for forming a recess in the mounting member according to embodiments of the present invention.
Figure 10B:
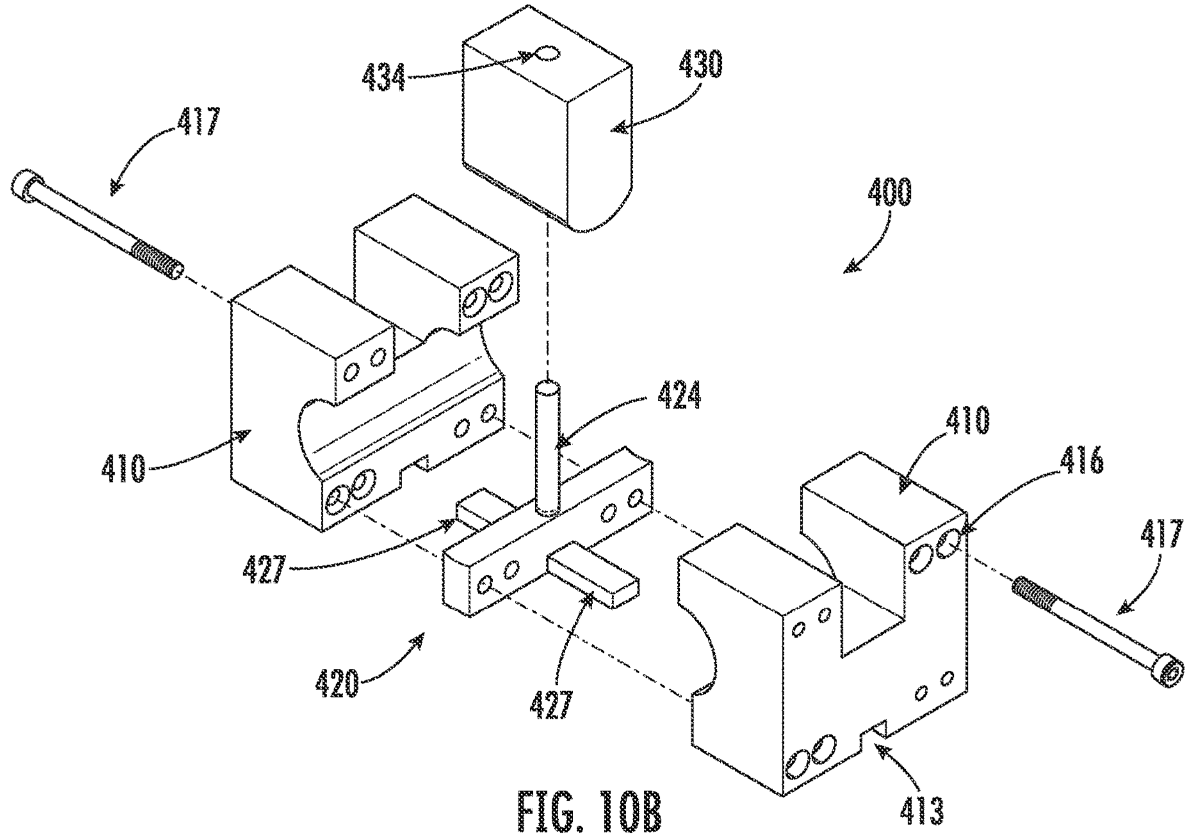
FIG. 10B is an exploded perspective view of the press tool of FIG. 10A.

Referring now to FIGS. 10A-11C, a press tool 400 according to embodiments of the present invention is illustrated. As discussed above, in some embodiments, the press tool 400 may be used to form the recesses 216, 216' in the mounting members 211. As shown in FIGS. 10A-11C, in some embodiments, the press tool 400 includes two clamp members 410, a pin block 420, and press form member 430. As shown in FIGS. 10A-10B, when secured together, the pin block 420 resides between the two clamp members 410 and at least a portion of the press form member 430 is configured to fit within a channel 404 formed by the secured together clamp members 410.

Figure 11A:
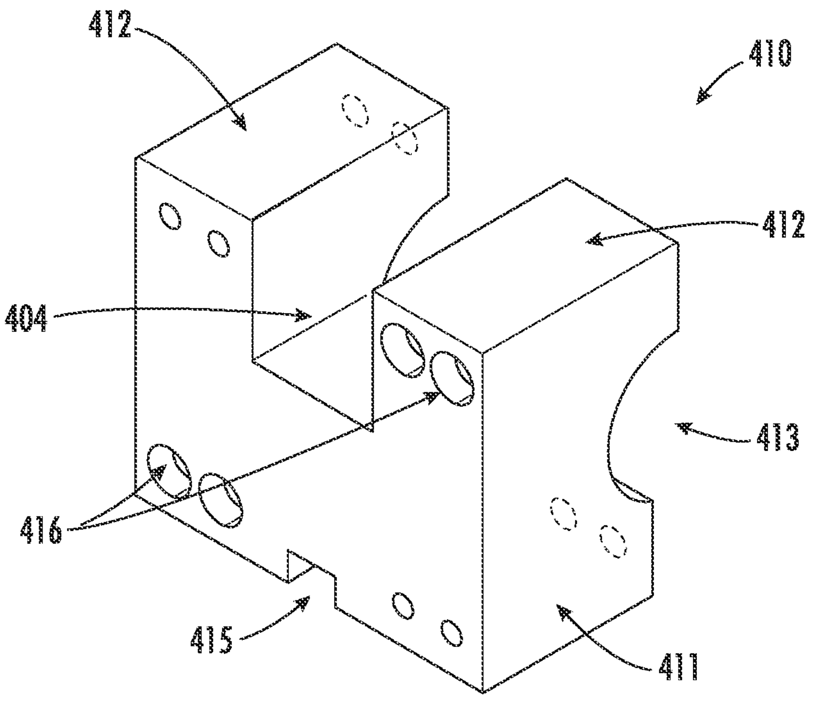
FIG. 11A is a perspective view of a clamp member of the press tool of FIG. 10A according to embodiments of the present invention.

FIG. 11A illustrates one of the clamp members 410 according to embodiments of the present invention. As shown in FIG. 11A, each clamp member 410 has a main body 411 with opposing sides 412 extending upwardly from the main body 411 to define a channel 404 therebetween. In some embodiments, the channel 404 is sized and configured to receive at least a portion of the press form member 430, for example, when the two clamp members 410 are secured together (see, e.g., FIG. 10A and FIG. 12). The main body 411 of each clamp member 412 includes a recess 413 having an arcuate profile. When secured together, the recesses 413 of each clamp member 410 cooperate to form a tubular channel 402 that is sized and configured to hold a section of a mounting member 211 (see, e.g., FIG. 12).

As shown in FIG. 11A, the main body 411 includes a second recess 415 residing along a bottom surface of the main body 411 and opposite to the channel 404. The second recess 415 is sized and configured to receive a respective arm member 427 of the pin block 420 (see, e.g., FIG. 10B).

The main body 411 of each clamp member 410 further includes a plurality of apertures 416. The apertures 416 are sized and configured to receive a respective fastener 417 (e.g., a threaded bolt), for example, to secure the two clamp members 410 together.

Figure 11B:
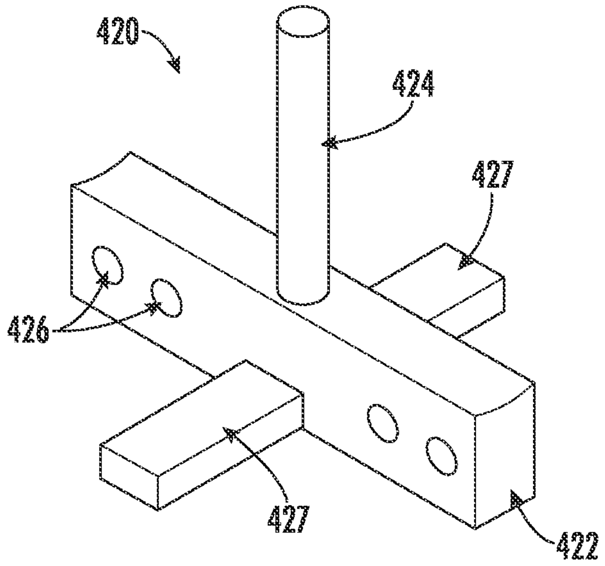
FIG. 11B is a perspective view of a pin block member of the press tool of FIG. 10A according to embodiments of the present invention.

FIG. 11B illustrates the pin block 420 of the press tool 400 according to embodiments of the present invention. As shown in FIG. 11B, the pin block 420 has a main body 422 having a plurality of apertures 426. The apertures 426 are sized and configured to receive a respective fastener 417. A pair of arms 427 extend radially outward from the main body 422, each arm 427 extending outwardly in opposing directions. As discussed above, each arm 427 is configured to be received within the second recess 413 of a respective clamp member 410 (i.e., when the pin block 410 is secured between the clamp members 410) (see, e.g., FIGS. 10A-10B). The apertures 426 are positioned in the main body 422 of the pin block 420 to align with corresponding apertures 416 in each clamp member 410 such that a fastener 417 can be inserted through the aligned apertures 416, 426 to secure the pin block 420 between the two clamp members 410.

The pin block 420 further includes a pin member 424 extending upwardly from the main body 422. The pin member 424 is sized and configured to be received through an aperture 211*a*' in the mounting member 211 (i.e., aperture 212*a* in vertical pipe 212 or aperture 214*a* in horizontal pipe 214) (see, e.g., FIG. 12). The pin member 424 is also sized and configured to be received within an aperture 434 in the press form member 430 (see, e.g., FIG. 10B and FIG. 12).

Figure 11C:
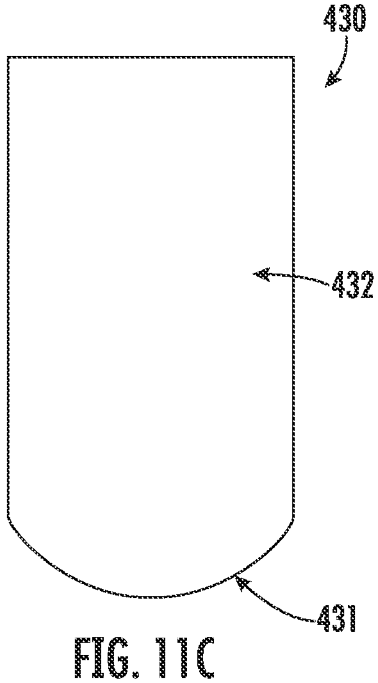
FIG. 11C is a side view of a press form member of the press tool of FIG. 10A according to embodiments of the present invention.

FIG. 11C illustrates the press form member 430 of the press tool 400 according to embodiments of the present invention. The press form member 430 has a main body 432 with an aperture 434 extending therethrough. As discussed above, the aperture 434 is sized and configured to receive the pin member 424 of the pin block 420. As shown in FIG. 11C, a bottom edge 431 of the press form member 430 has an arcuate shape that corresponds to the outer profile of a mounting member 211 and is configured to form the recess 216 in the mounting member 211 (i.e., vertical pipe 212 and/or horizontal pipe 214).

Figure 12:
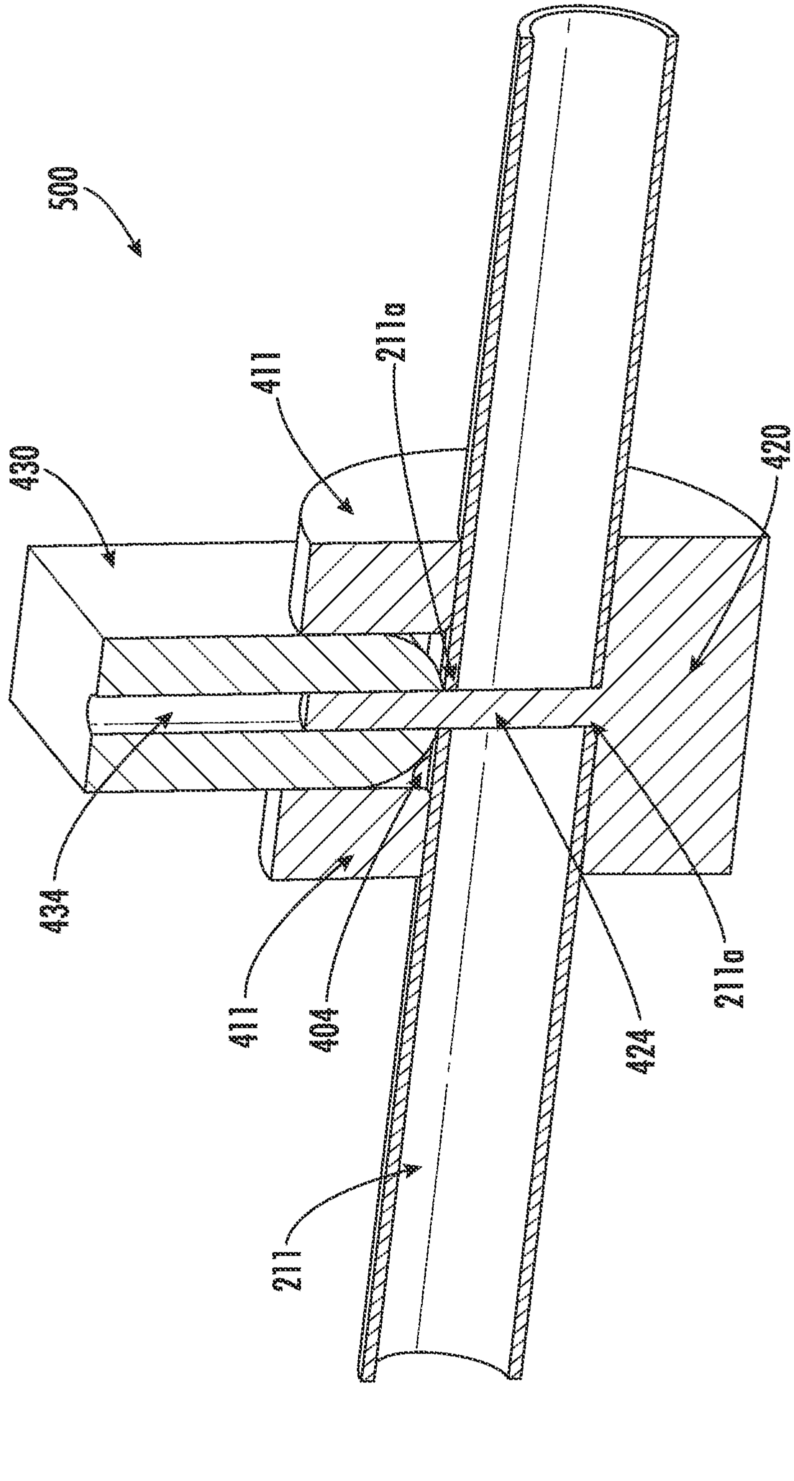
FIG. 12 is a cross-sectional view of the press tool in combination with a mounting member according to embodiments of the present invention.

FIG. 12 is a cross-sectional view illustrating a mounting member 211 secured within the press tool 400. As shown in FIG. 12, the pin member 424 is received by and extends through apertures 211*a* in the mounting member 211. The apertures 211*a* indicate the location on the mounting member 211 where a recess 216 should be formed. To form the recess 216, the press form member 430 is guided downwardly within the channel 404 between the opposing sides 411 of the clamp members 410 and along the pin member 424. As press form member 430 moves downwardly, it compresses the mounting member 211 to form a recess 216 having a corresponding shape to the arcuate profile of the bottom edge 431 of the press form member 430 (in this instance, a generally semi-cylindrical shape). The press form member 430 compresses the mounting member 211 until the bottom edge 431 penetrates to the desired depth for the corresponding recess 216 being formed (see, e.g., FIGS. 4D, 5E and 8A). In some embodiments, multiple press tools 400 may be secured along the length of the mounting member 211 to form multiple recesses 216 simultaneously.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A telecommunications structure, comprising:

a plurality of mounting members each having a length and a diameter, the plurality of mounting members includes one or more vertically-oriented mounting members that intersect with one or more horizontally-oriented mounting members to form a frame that is configured to have telecommunications equipment mounted thereto, wherein each of the one or more vertically-oriented mounting members or each of the one or more horizontally-oriented mounting members includes a plurality of longitudinally spaced-apart recesses configured to receive an intersecting horizontally-oriented mounting member or vertically-oriented mounting member and form a mechanical connection therebetween, and wherein an aperture resides within each recess, each aperture configured to receive a fastener to secure the intersecting mounting members, wherein the frame forms part of a telecommunications assembly.

2. The telecommunications structure of claim 1, wherein each of the one or more vertically-oriented mounting members include the plurality of spaced-apart recesses.

3. The telecommunications structure of claim 1, wherein each of the one or more horizontally-oriented mounting members include the plurality of spaced-apart recesses.

4. The telecommunications structure of claim 1, wherein each of the recesses has an arcuate profile corresponding to the outer profile of the mounting members.

5. The telecommunications structure of claim 1, wherein each of the recesses penetrates about half the diameter of the respective mounting member.

6. The telecommunications structure of claim 1, wherein each of the recesses penetrates less than half the diameter of the respective mounting member.

7. The telecommunications structure of claim 1, wherein each of the recesses is formed by making a semi-cylindrical cut in the mounting member.

8. The telecommunications structure of claim 1, wherein each of the recesses are formed by a press tool.

9. The telecommunications structure of claim 1, wherein each recess has a hemi-hexagonal shape with a generally flat bottom section.

10. A press tool, comprising:

two clamp members configured to cooperate with each other to form a tubular channel that is sized and configured to hold a section of a mounting member therein;

a pin block member having a main body, the pin block member including a pin member extending upwardly from the main body and a pair of arm members extending outwardly from the main body in opposite directions; and a press form member having a main body with an aperture extending therethrough, the aperture configured to receive the pin member, wherein, when secured together, the pin block member resides between the two clamp members and at least a portion of the press form member is configured to fit within a channel formed by the secured together clamp members, and wherein the press form member is configured to press into the section of the mounting member to form a recess.

11. The press tool of claim 10, wherein each clamp member has a main body with opposing sides extending upwardly from the main body to define a portion of the channel.

12. The press tool of claim 10, wherein each clamp member has a recess having an arcuate profile which, when secured together, cooperate to form the tubular channel.

13. The press tool of claim 11, wherein the main body of the of each clamp member includes a recess residing along a bottom surface of the main body opposite to the channel portion, the recess being configured to receive a respective arm member of the pin block member when the pin block member is secured between the clamp members.

14. The press tool of claim 10, wherein the clamp members and the pin block member include a plurality of apertures configured to receive respective fasteners to secure the two clamp members and pin block member together.

15. The press tool of claim 10, wherein the pin member is configured to be received through an aperture in the mounting member when secured between the clamp members.

16. The press tool of claim 10, wherein a bottom edge of the press form member has an arcuate shape that corresponds to the outer profile of the mounting member.

17. A method of forming recesses in a mounting member of a telecommunications structure, the method comprising:

providing the mounting member having a length and a diameter, wherein the mounting member has a plurality of spaced-apart preformed apertures;

providing a press tool including two clamp members, each clamp member having a arcuate recess configured to cooperate with each other to form a tubular channel, a pin block member including a pin member extending upwardly from a main body, and a press form member having a main body with an aperture extending therethrough, wherein a bottom edge of the main body of the press form member has an arcuate profile;

inserting the pin member of the pin block member into respective apertures in the mounting member such that the pin member extends through the mounting member;

pushing the clamp members together to engage and secure a section of the mounting member within the tubular channel;

placing the arcuate bottom edge of the press form member on top of the pin member of the pin block member such that the pin member is received within the aperture of the press form member and the arcuate bottom edge of the press form member contacts the mounting member; and pushing the press form member downwardly into the mounting member a predetermined depth to form a recess in the mounting member.

18. The method of claim 17, wherein more than one press tool is used to simultaneously form multiple recesses in the mounting member.

19. The method of claim 17, wherein the predetermined depth is about half of the diameter of the mounting member.

20. The method of claim 17, wherein the predetermined depth is less than half of the diameter of the mounting member.

* * * * *